Dec. 10, 1957  D. E. LUPFER  2,815,663
SLIP PROBE ASSEMBLY
Filed Dec. 13, 1954
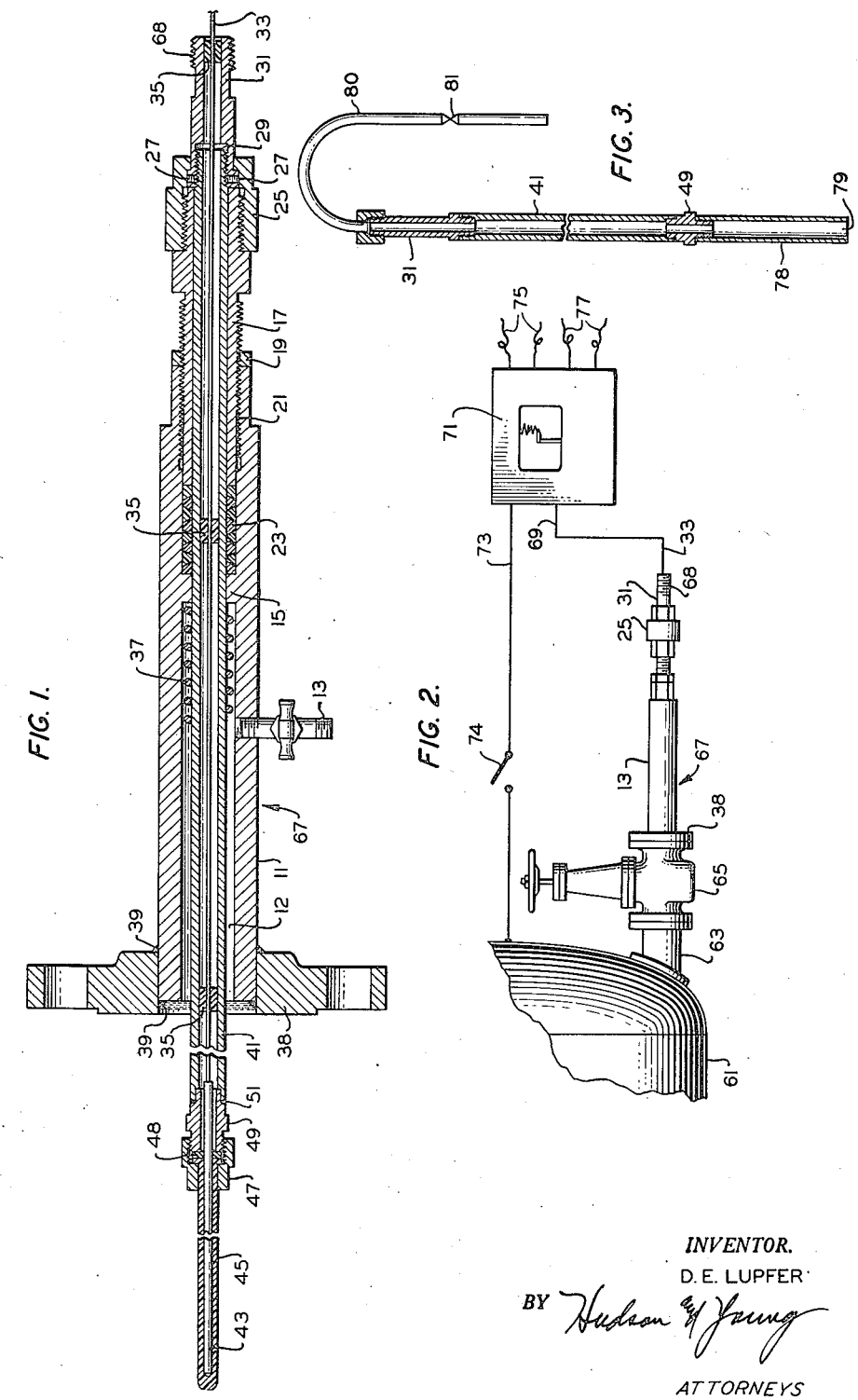
INVENTOR.
D. E. LUPFER
BY Hudson & Young
ATTORNEYS ID
Patented Dec. 10, 1957

2,815,663

SLIP PROBE ASSEMBLY

Dale E. Lupfer, Bartlesville, Okla., assignor to Phillips Petroleum Company, a corporation of Delaware Application December 13, 1954, Serial No. 474,730

3 Claims. (Cl. 73—342)

This invention relates to means for inserting a probe into and removing a probe from a vessel under superatmospheric pressure. In one aspect it relates to a means for inserting a probe, such as a thermocouple, thermometer, electrode or the like, into and removing such a probe from a tank maintained under superatmospheric pressure.

It is relatively easy to obtain samples of liquid contents from tanks, to gauge liquid contents in tanks when the tanks are open to atmospheric pressure. In such cases, for example, in order to sample the contents of the tank it is merely necessary to open a hatch, lower a sampling device to the floor of the tank and to raise the sampling device upward through the contents of the tank whereby an average sample is obtained. In case it is desired to obtain a sample of the contents of the tank at any level in the tank the sampling device is merely lowered to the desired level and the sample taken. Likewise, to determine the depth of a layer of water on the floor of a tank in which petroleum fractions are stored is a simple matter, one method being to attach a thief paper to a gauge stick and to lower the paper thereby to the bottom of the tank. Upon retrieving the paper the depth of water in the tank is indicated by a change in color of the paper which was in contact with the water. The use of a gauge glass for visual observation of the surface of a liquid or of the interface between two liquids in a tank maintained under pressure is not, in many cases, best policy. In case of breakage of the gauge large loss of liquid would result and in case the liquid is a hydrocarbon, a fire can result.

An object of my invention is to provide a means for inserting a probe into and for removing a probe from a tank.

Another object of my invention is to provide means for inserting a probe into and for removing a probe from a tank maintained under superatmospheric pressure.

Another object of my invention is to provide such a means which is relatively simple to construct, assemble and disassemble, and to use.

I accomplish these and other objects by providing a slip probe assembly for inserting a probe into a vessel and for removing said probe from said vessel under pressure comprising, in combination, an elongated body member having an axial opening throughout its length, attachment means at one end of said body member, a slip tube in said opening, a packing gland intermediate said slip tube and said body member, a slip tube union at the end of said slip tube opposite said attachment means, said union being adapted to hold said slip tube against axial movement in said body member and a probe on the other end of said slip tube.

In the drawing, Figure 1 is a longitudinal view, in section, of one embodiment of my invention.

Figure 2 is an elevational view in diagrammatic form, of the apparatus of my invention attached to a tank.

Figure 3 is a view, partly in section, of another embodiment of my invention.

Referring now to the drawing and specifically to Figure 1, the probe apparatus includes an elongated body member 11 having an opening 12 throughout its length. On one end is disposed means for attaching this body member to a valve, this means being a flange 38. Within the body member and at a point somewhat closer to the other end of the body member is disposed an internal flange or shoulder 15. This flange serves as a seat against which packing 23 is compressed by a packing nut 17 disposed within the opening 12 and throughout the length of the body member 11 and packing nut 17 is a slip tube 41. The interior surface of the body member 11, at the end opposite flange 38, is threaded to accommodate the threaded section of the packing nut, these threads being identified by reference numeral 21. The packing nut is relatively long and it extends some distance outside of the body member. The end of the packing nut 17 opposite the packing 23 is threaded to accommodate a union nut or ring 25. As illustrated in Figure 1 the right hand end of the slip tube 41 is threaded and to this threaded section is attached a union tail piece 31. The threaded sections of the slip tube and of the union tail piece are identified by reference numeral 29. The right hand end of this union tail piece 31 is threaded at 68 to accommodate other tubing or pipe as desired. A lock nut 19 is provided as shown for locking the packing nut in position against rotation. In order to make certain that the union tail piece 31 does not become loosened from the slip tube 41, one or more set screws 27 are provided as shown. A helical spring 37 is inserted into the body member 11 surrounding the slip tube 41 on the left hand side of flange 15. The left hand end of the slip tube 41 is attached to a nipple 49 by threading or by welds 51. The nipple 49 at its point of maximum diameter has a diameter greater than the inside diameter of the spring 37 and also greater than the inner diameter of the internal flange 15. At least one packing ring 48 is disposed at the left hand end of the nipple 49 and against this packing ring 48 is positioned a probe element 45 in the form of an elongated cylinder having a flange at one end and its other end closed. The flange end of the probe is intended to be held tightly against the packing ring 48 by the take-up nut 47.

In case the probe assembly is used for assistance in determining the level of a liquid in a tank or a surface between two liquids an electrode 43 is disposed within the probe 45. This electrode extends to the right beyond the flanged end of the probe and from this end of the electrode a conductor 33 extends through the entire length of the slip tube 41.

In case the probe assembly is to be used for assistance in determining the temperature of the contents of the tank, a thermocouple is inserted into the probe 45 with lead wires extending from the couple to the right through the entire length of the slip tube. In this case reference numeral 33 identifies a pair of conductor wires leading from the couple to an electrical instrument.

In case an electrode for measuring the flow of electricity from the electrode to the tank walls is inserted in the probe 45 one or more openings are provided in the walls of the probe for contact with the liquid. One or more spacers 35 are provided in the slip tube 41 for proper positioning of the conductor wire or wires throughout its length.

In Figure 2 is illustrated this probe assembly 67 disposed in operative position with respect to a tank 61. The probe assembly 67 is attached by flange 38 to a valve 65, preferably a plug valve. This valve in turn is attached to a nipple 63 which is attached to the tank. Conductor or conductors 33 from the right hand end of the union tail piece 31 are connected to a conductor or conductors 69 leading to an electrical measuring instrument 71. In case the probe assembly is provided with a single electrode for completing a circuit, conductors 33 and 69 are a single wire, and in order to complete the circuit another wire 73 leads from the instrument 71 to the tank. In this case switch 74 is provided for opening and closing the circuit. In case the probe assembly is provided with a thermocouple, conductors 33 and 69 are a pair of wires and these wires complete the circuit from the thermocouple to the instrument 71 and conductor 73 is not used and in order to disconnect this wire switch 74 is opened or wire 73 and switch are omitted. A pair of wires 75 from a source of electrical energy, not shown, provides current for operating the instrument 71. In case this electrical instrument is a control instrument as well as a measuring or indicating instrument, a pair of lead wires 77 is provided leading to an apparatus to be controlled, such as a valve.

In the operation of the probe assembly of my invention, a valve 65, Figure 2 is always used and the probe is attached to the side of the valve opposite the tank. To attach the probe assembly to the valve the union nut 25 is loosened, the packing lock nut 19 and the packing nut 17 are also loosened. The slip tube assembly which includes the slip tube and probe are moved to the right until the large diameter section of the nipple 49 contacts the coil spring 37. Under this condition the left hand end of the probe 45 is approximately flush with the flange 38. The flange 38 is then bolted to the corresponding flange of valve 65. When this connection is tightly made, the valve 65 is carefully opened. When the valve is open the pressure from within the tank is exerted against the probe 45 and spring 37 may be compressed. The slip tube assembly is then forced from right to left and the union ring is tightened and the packing nut is tightened against packing 25 and the assembly is then leakproof.

When it is desired to remove the probe from the tank it is merely necessary to unthread the union ring 25 about ½ to ¾ of an inch. The packing nut 17 is also unthreaded to relieve pressure on the packing. With the union ring unthreaded this distance the operator is able to rotate the union tail piece 31 and slip tube 41. When the operator is able to rotate manually the union tail piece 31 he is certain that the slip tube 41 is free from the packing 23. When the slip tube is free from the packing the operator then completely unscrews the union ring 25 from the packing nut 17 and withdraws the slip tube 41 to the right to such a distance that the nipple 49 reaches the compression spring 37. In this position of the slip tube the end of the probe 45 is clear from the valve and the valve 65 is closed.

Drain valve 13 is provided in the body member 11 at about the position indicated in Figure 1 in order to drain liquid from space 12, and to relieve the pressure therein before unbolting flange 38 from the flange of the valve 65.

In Figures 1 and 2, is shown for illustrative purposes only, my slip tube assembly probe provided with a thermocouple and conductors 33 being a pair of insulated wires leading to such an electrical instrument as instrument 71. If it is desired to employ my apparatus in the control of a liquid level or of an interface between two immiscible liquids, for the thermocouple 43 of Figure 1, I substitute a single electrode. In this case the conductor 33 is a single wire leading to an instrument, to complete the circuit switch 74 is closed in conductor 73. If it is desired to employ a thermister, or an electrical resistance wire, for measuring temperatures in a tank, conductor 33 is a pair of insulated wires similar to those employed when a thermocouple is inserted in the probe 45.

If it is desired to make a direct determination of the temperature a thermometer having a long stem is inserted through the slip tube from right to left of Figure 1 until the bulb of the thermometer reaches the left hand end of probe 45. Temperature can then be directly observed from the portion of the thermometer extending beyond the union tail piece 31.

If it is desired to employ my probe assembly as a sampling device, as illustrated in Figure 3, a probe tube 78 having one or more openings 79 therein is provided in place of the probe 45. This tube 78 is connected to the slip tube 41 by means of nipple 49 and the slip tube 41 and associated parts are mounted in an elongated body member 11 as was described relative to Figure 1. In this case the threaded end 68 of the union tail piece 31 is connected to a sample tube 80 having a valve 81. The wire or wires 33 are not used. After fastening the flange of the probe tube assembly to the flange of a tank valve the valve is opened and the probe tube 78 is pushed into the tank and liquid then is allowed to flow through the sample tube 80 merely by opening the tube valve 81. In this case, however, the valve through which the probe tube is inserted into the tank is ordinarily positioned on top of the tank but such positioning of the valve is not necessary and a sample of the contents of the tank immediately inside the valve at other locations can be obtained. In case it is desired to obtain a tank sample at different levels in the tank the valve through which the probe is inserted is positioned on the top of the tank and as the sample is being taken the slip tube 41 and union tail piece 31 are moved up and down with, of course, the union ring 25 being unthreaded from the packing nut 17. In this case when sampling is complete the valve 81 of the sample tube is closed and the slip tube and union tail piece are withdrawn from the tank until the nipple 49 reaches the spring 37 under which condition the valve corresponding to valve 65 is closed. The probe tube assembly is allowed to remain in this position until further use or it is removed from the tank for use elsewhere, or for storage. The probe tube assembly of my invention is also used as a slip gauge. In this case the valve through which the slip tube is inserted is attached to the top of the tank and the probe tube attached to the end of the slip tube contains at least one opening as disclosed in relation to the sampling tube. In this case, however, the union ring 25 is unthreaded from the packing nut 17 and the slip tube and union tail piece are moved from top downward until such time that liquid emerges from sample tube 80 attached to the union tail piece 31. When liquid is thus expelled it is known that the opening in the lower end of the probe tube is just below the surface of the liquid and with the apparatus having been previously calibrated, the depth of the liquid in the tank becomes known.

In place of these several instruments herein disclosed as being used in determining liquid level, interface between two liquids, as a sampling or slip gauge device any other suitable instrument known in the art can be used.

Electrical circuits for use with my apparatus when the probe is a coated electrode are fully described in co-pending applications Serial No. 376,960, filed August 27, 1953, and Serial No. 478,612, filed December 30, 1954, by Ernest D. Tolin and Sidney R. Kline, and for brevity such apparatus is only very briefly discussed herein.

Electrical instruments as illustrated in Figure 2 of the drawing are available commercially for use with my apparatus when the probe is a thermocouple. Such instruments are likewise available for use with my apparatus when the probe is a thermister.

While certain embodiments of the invention have been described for illustrative purposes the invention obviously is not limited thereto.

I claim:

1. A slip probe assembly for inserting a probe into a vessel and for removing said probe from said vessel under pressure, comprising, in combination, an elongated body member having an axial opening throughout its length, an external attachment means on one end of said body member, an internal flange around the inner wall of said body member, a slip tube in said opening, a packing intermediate said slip tube and said body member on the side of said internal flange opposite said external attachment means, a packing nut in the end of said body member adjacent said packing, a union tail piece threaded to the end of said slip tube adjacent said packing nut, a union ring threaded to said packing nut to hold said slip tube against longitudinal movement in either direction in said body member, a nipple attached at one end to the end of said slip tube near said external attachment means, a probe on the other end of said nipple, a compression spring surrounding said slip tube intermediate said internal flange and said external attachment means, said nipple having an external diameter less than the internal diameter of said body member and greater than the internal diameter of said spring.

2. In the assembly of claim 1, a drain valve disposed in the wall of said body member intermediate said internal flange and said external attachment means.

3. In the assembly of claim 2 wherein said external attachment means is a flange.

References Cited in the file of this patent

UNITED STATES PATENTS

| | | |
|---|---|---|
| 980,665 | Ord | Jan. 3, 1911 |
| 1,683,489 | Rice | Sept. 4, 1928 |
| 1,862,920 | Boynton | June 14, 1932 |
| 1,883,583 | Cole | Oct. 18, 1932 |
| 2,450,142 | Holicer | Sept. 28, 1948 |
| 2,615,339 | Holgersson et al. | Oct. 28, 1952 |

FOREIGN PATENTS

| | | |
|---|---|---|
| 504,660 | Great Britain | Apr. 28, 1939 |